INVENTOR.
Francis Le Barron Lord
BY Edward G. Roe
Attorney

United States Patent Office 2,758,626
Patented Aug. 14, 1956

2,758,626

LOCK NUT COMPRISING AN EXTERNAL SHELL MEMBER COOPERATIVELY KEYED TO A THREADED SPLIT INTERNAL MEMBER

Francis Le Barron Lord, Everett, Mass., assignor of one-half to Eloise T. Roe, Pleasantville, N. Y., and one-half to Arthur B. Bellwood, Wellesley, Mass., and Charles F. Batchelder, Jr., Milton, Mass., and Mary Bertha Byars, Everett, Mass., trustees Application October 20, 1952, Serial No. 315,683

3 Claims. (Cl. 151—19)

Generically, the invention relates to locking and threading devices, and in particular it constitutes improvements in my Patent Number 2,443,466 dated June 15, 1948.

An object of the invention comprehends a lock nut which can be employed on any conventional stud which, once it is threaded home, can not be shaken loose through vibration or any other cause.

Another object contemplates a lock nut which can be made of light weight materials, such as aluminum, magnesium, plastic, or other man-made materials in addition to the usual metals and alloys thereof.

A still further object envisions a lock nut in which the thread contact area under load will be 100%, in contradistinction to present conventional fasteners wherein from 25% to 37% represents the total thread contact area under load.

Additional objects include:

(a) Total resistance to thread stripping;

(b) Lack of thread distortion under load;

(c) Self-locking action which develops both a friction and compression lock within the fastener;

(d) Elimination of fatigue failures;

(e) Minimum of control of thread tolerance.

These and other objects will be manifest after a perusal of the accompanying description and drawing.

Briefly described, the lock nut comprises an external member internally tapered large to bottom, the upper rim being flanged, the inner bore provided with a key having abrupt and bevelled faces, and an internal member internally threaded, tapered small to bottom to mate the bore of the external member, and provided with a keywall also having abrupt and bevelled faces cooperating with the key of the external member. The outer member may have a hex-wrench peripheral surface for ease of handling.

Figure 1:
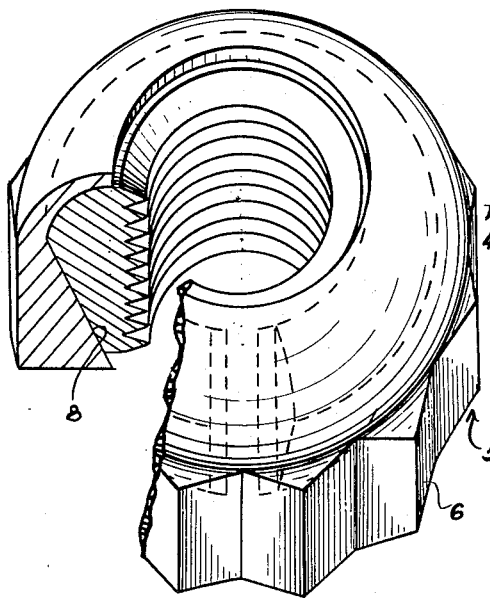
Fig. 1 is a schematic perspective view of the lock nut, with part being broken away.

With reference to the drawing, the lock nut 5 comprises outer member 6 the outer peripheral surface of which may be, for example, duo-hex, with the upper rim portion being crimped or flanged as at 7, while internally member 6 is bored with a taper bore 8 small to bottom. Internally of the taper bore 8 I provide key 9 having abrupt face 10 and bevelled face 11.

Figure 3:
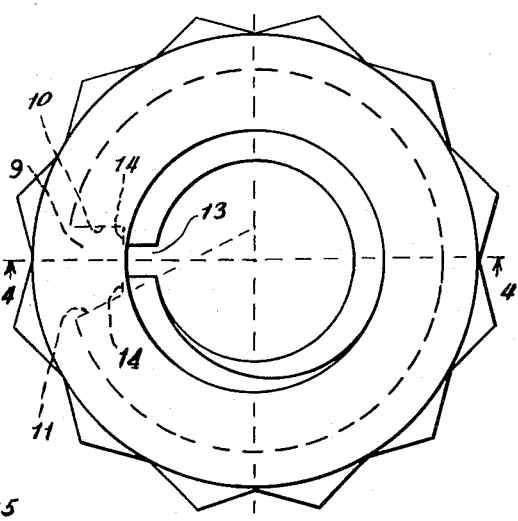
Fig. 3 is a top plan view of the lock nut showing the cooperation of the key and keyway.
Figure 2:
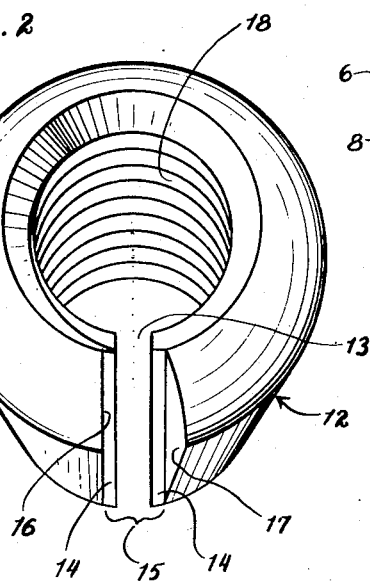
Fig. 2 is a perspective view of the internal member of the lock nut.
Figure 4:
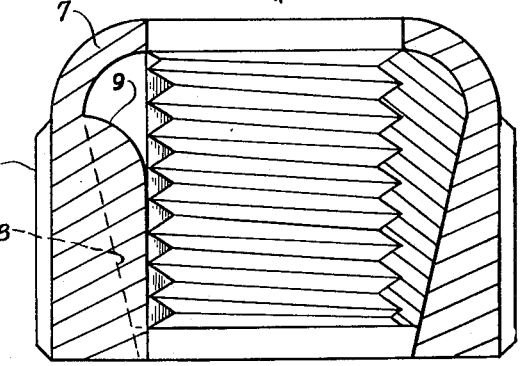
Fig. 4 is a cross sectional view taken through lines 4—4 of Fig. 3.

Cooperating with outer member 6 is inner member 12 tapered small to bottom having an axial slit 13; the confronting ends of the slit having shoulders 14, which define the bottom of keyway 15 having abrupt face 16 and bevelled face 17, which accommodates key 9. It is to be noted that axial slit 13 is relatively narrower and of less depth than the keyway 15 and is provided with parallel sidewalls in contradistinction to the abrupt and bevelled or radial faces of the key for the purpose of providing the maximum internal threaded area of inner member 12. The innermost face, in relation to axis, of key 9, is in adjacent relation to the largest diameter of the threads of inner member 12. Member 12 is internally and right hand threaded at 18 as indicated in Fig. 3. I may employ a left hand thread, however, in which case the abrupt and bevelled faces of the key and keyway would be reversed.

With reference to flange 7 of member 5, this is provided in order to hold the members in assembled relationship but other expedients may be employed for this purpose other than a flange or crimp.

When the lock nut is tightened on a conventional stud, the key 9 of the outer member implements the threading of internal member 12 and the lock nut on to the stud. The abrupt face 10 of key 9 presses on abrupt face 16 of the key serving to advance the lock nut on and once threaded home, any tendency of the nut to loosen is prevented by the pressing of bevelled face 11 of key 9 on bevelled face 17 of keyway 15, causing inner member 12 to exert gripping pressure throughout its entire internal dimension against the threads of a stud—precluding loosening.

Figure 5:
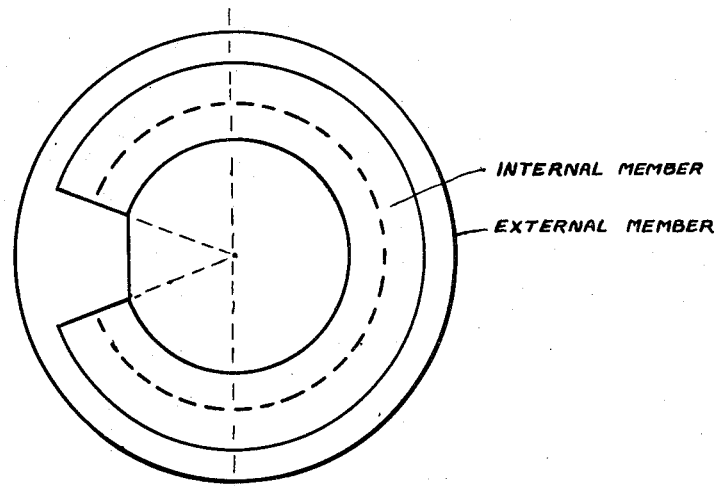
Fig. 5 is an analysis drawing of a modification.

In the modification shown in Fig. 5 the same amount of torque is required to tighten as to loosen. One great advantage of this modification is its use in jet planes where the heat is tremendous, to prevent the nut from vibrating to an extremely tight position from which it could not be loosened, yet vibratory loosening is prevented by the neutral condition of the key and key way to the axis turn.

Figure 6:
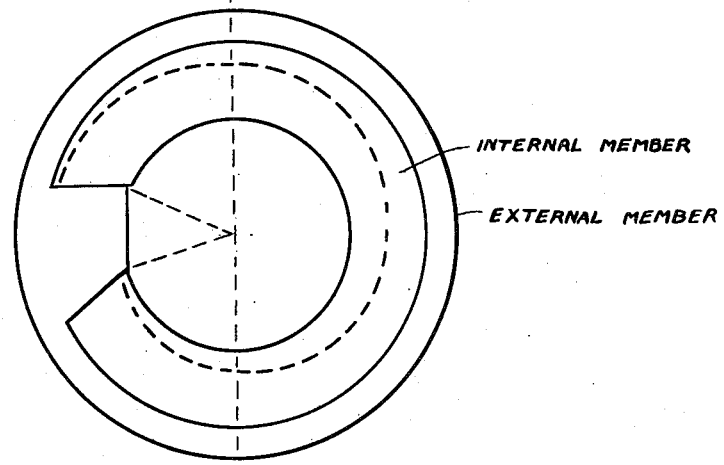
Fig. 6 is an analysis drawing of another modification.

In the Fig. 6 modification any force causing the nut to move will cause it to advance in positive or advance relation.

Figure 7:
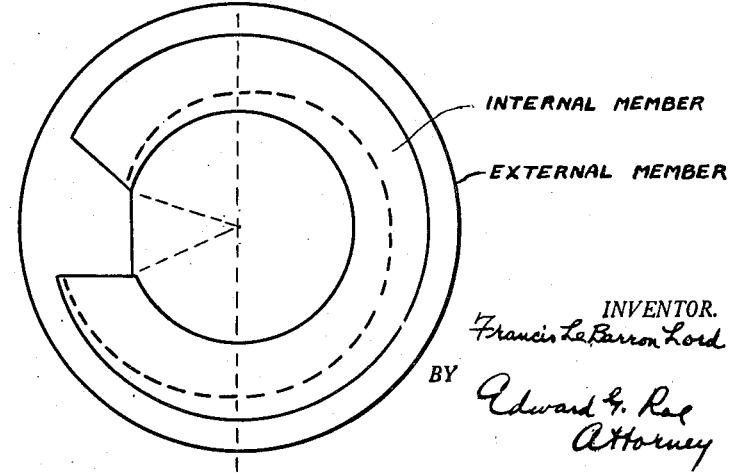
Fig. 7 is still another modification.

In the modification depicted in Fig. 7 a nut is illustrated which can be easily removed because moving the nut in a counter clockwise direction lifts the force of the nut away from the screw.

The following advantages and improved results are accomplished by the use of my lock nut, and for purpose of explication, I give below, by columns, first the area in which the advantage or result is accomplished and secondly, exactly what, by test is demonstratably accomplished:

| Characteristic | Proven advantages and results |
| --- | --- |
| 1. Thread contact area under load. | Practically 100% of total thread area in contact regardless of tolerances on mating members. Both sides of thread in contact. When locked, a practical unitary condition is established. |
| 2. Resistance to thread stripping. | Threads will not strip. |
| 3. Thread reaction under load. | No thread distortion. Thread surfaces burnish and improve with use. Fastener adjusts itself to wear of mating threads. |
| 4. Amount of thread engagement required. | ½ to 1 diameter or approximately ⅓ that of conventional threads because of filling out of thread form and practical establishment of unitary condition. |
| 5. Distribution of load within fastener. | Self-locking action develops both a friction and compression lock on all thread surfaces. Load is evenly distributed with the exception of some stress gradient at point of keying. High, local stress concentrations appreciably minimized. |
| 6. Fatigue performance | This lock nut approaches elimination of the basic cause of fatigue failure. |
| 7. Reaction to vibration | Tightens under vibration. This action can be controlled by the angular relation of the negative face of the key. |
| 8. Thread tolerance requirements. | Tolerances are unimportant within wide wide limits. Neither male nor female member need be closely controlled. |
| 9. Distribution of lock-up energy (hold-down thread gripping-friction). | With this lock nut hold-down versus thread gripping can be increased or decreased (to suit specific applications) by changing the taper angle. |
| 10. Use in soft materials (aluminum - magnesium plastics). | Excellent in soft materials because of the basic, practical unitary thread conditions established. No damage on insertion. |
| 11. Removal and replacement of broken screw member. | Procedure: 1. Break relation between tapered surfaces; 2. In screw broken piece; 3. Insert same size stud. Simple, fast and inexpensive. No special sizes required. |
| 12. Pre-loading of screw member. | Mechanical action of this lock nut makes preloading unnecessary. No load distortion except in unused portion of threads. |
| 13. Use with multi-lead threads. | Very practical because of the high friction and compression lock on all thread surfaces. Multi-lead thread can now be used in load carrying (tensile) and vibratory applications. |

In its broader aspects, the invention comprehends the employment not only of the means described but of equivalent means for performing the recited functions. It is desired to reserve the right to effect such changes as may come within the scope of the appended claims.

I claim:

1. In combination with a threaded stud, a lock nut comprising an external member defining a complete annulus and having an internal bore tapering toward the bottom, the external surface being formed for cooperative engagement with a wrench, a key fixed in said bore and having an abrupt and a bevelled face, and an inner face, a split annular internal member exteriorly tapered for mating engagement in said bore, the inner split portion of said internal member having parallel sidewalls and a pair of oppositely disposed shoulders and an enlarged continuation of said split portion forming a keyway bottomed on said shoulders, having abrupt and bevelled faces for mating engagement with the abrupt and bevelled faces, respectively of said key, internal screw threads formed on said internal member mating the threads on said stud, and an inturned flange on the upper end of said external member and in abutting engagement with said internal member for holding the latter in position within said bore, the inner face of said key in approximate adjacent relation to the largest diameter of the threads of said internal member.

2. A lock nut comprising an external member defining a complete annulus and having an internal bore tapering toward the bottom, the external surface of said external member adapted for cooperating engagement with a wrench, a key fixed in said bore and having two opposing faces in line with the axis of rotation, a split annular internal member exteriorly tapered for mating engagement in said bore, the split portion of said internal member having parallel sidewalls and a pair of oppositely disposed shoulders and an enlarged continuation of said split portion forming a keyway bottomed on said shoulders and having opposing faces for mating engagement with the faces of said key, internal screw threads formed on said internal member, and an inturned flange on the upper end of said external member and in abutting engagement with said internal member for holding the latter in position within said bore, the opposing faces of the key and keyway being in neutral condition to the axis turn whereby the same amount of torque is required to loosen said nut as to tighten.

3. In combination with a threaded bolt, a lock nut comprising an external member defining a complete annulus and having an internal bore tapering toward the bottom, the external surface thereof being formed for cooperative engagement with a wrench, a key fixed in said bore having opposing faces in line with the axis of rotation, and an inner face, a split annular internal member, exteriorly tapered for mating engagement in said bore, the inner split portion of said internal member having parallel sidewalls, a pair of shoulders at the outer ends of said sidewalls, the outer split portion being wider and deeper than the inner portion and forming a keyway having a pair of faces for mating engagement with the faces of said key, internal screw threads formed on said internal member mating the threads on said bolt, and an inturned flange on the upper end of said external member and in abutting engagement with said internal member for holding the latter in fixed position within said bore, the inner face of said key in adjacent relation to the largest diameter of the threads of the internal member, the opposing faces of the key and keyway being in neutral condition to the axis turn, whereby the same amount of torque is required to loosen said nut as to tighten.

References Cited in the file of this patent

UNITED STATES PATENTS

| 622,307 | Wilson | Apr. 4, 1899 |
| 2,079,746 | Morgan | May 11, 1937 |
| 2,266,961 | Desbrueres | Dec. 23, 1941 |
| 2,443,466 | Lord | June 15, 1948 |
| 2,627,293 | Le Boeuf | Feb. 3, 1953 |

FOREIGN PATENTS

| 10,217 | Great Britain | Apr. 26, 1910 |
| 116,503 | Australia | Feb. 11, 1943 |
| 131,668 | Australia | Mar. 7, 1949 |
| 286,785 | Italy | June 22, 1931 |